Aug. 28, 1945.                C. SWIFT                2,383,828
                            ELECTRIC MOTOR
                         Filed April 28, 1944
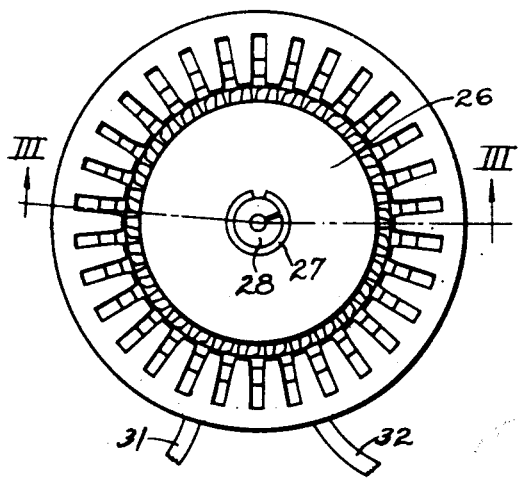
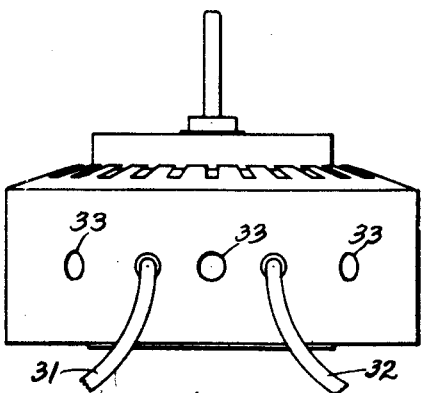
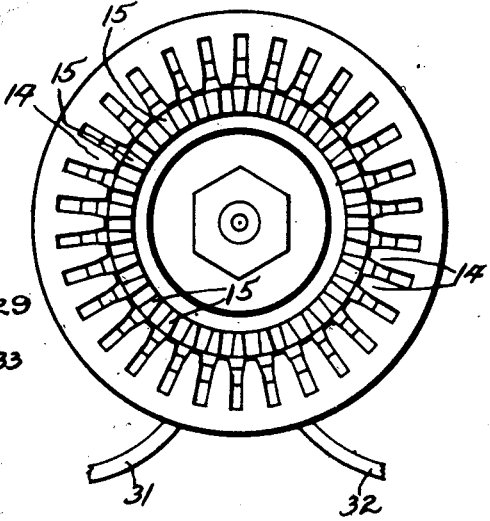
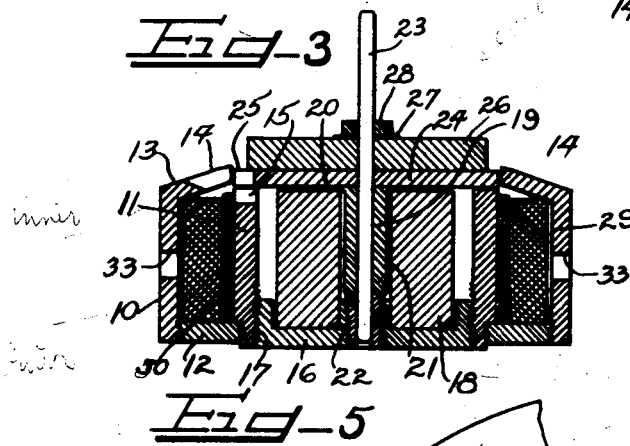
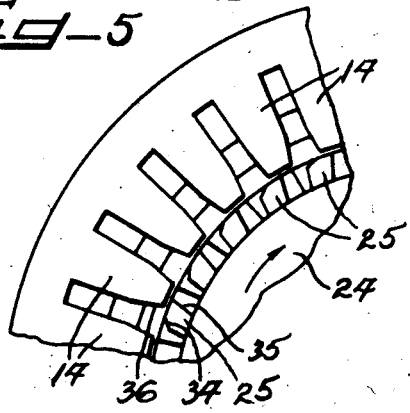
INVENTOR
Cyrus Swift
by Charles W. Hills Attys Patented Aug. 28, 1945

2,383,828

UNITED STATES PATENT OFFICE 2,383,828

ELECTRIC MOTOR

Cyrus Swift, Chicago, Ill.

Application April 28, 1944, Serial No. 533,180

5 Claims. (Cl. 172—278)

This invention relates to an electric motor, and more particularly to a self-starting synchronous motor.

One of the principal features of the present invention is to provide a small fractional horsepower synchronous motor of the type developing enough torque to drive a clock mechanism or other relatively low power consuming device. It is desirable, in motors of this class, to provide a structure which is simple, economical to manufacture, and rugged and reliable in use. It is also desirable to provide a structure in which the starting torque as well as the running torque is sufficient to operate relatively small mechanisms, but which torque is relatively large compared to the size of the motor.

It is an object of the present invention to provide a novel synchronous motor having the above highly desirable characteristics.

It is a further object of the present invention to provide a novel self-starting synchronous motor.

It is a further object of the present invention to provide a self-starting single phase synchronous motor which will always run in the same direction.

Another object of the present invention is to provide a novel motor of which all of the poles of the rotor are of the same magnetic polarity.

Another and further object of the present invention is to provide a novel electric motor having two stator portions each with an annular set of teeth in proximity to the rotor.

Still another and further object of the present invention is to provide a novel magnetic circuit for an electric motor or other dynamo electric machine.

The novel features which I believe to be characteristic of my invention are set forth with particularity in the appended claims. My invention itself, however, both as to its organization, manner of construction and method of operation, together with further objects and advantages thereof, can best be understood by reference to the following description taken in connection with the accompanying drawing, in which:

Figure 1 is a plan view of an electric motor embodying the novel features of the present invention;

Figure 2 is an elevational view of the motor shown in Figure 1;

Figure 3 is a vertical sectional view of the motor as taken along the line III—III of Figure 1;

Figure 4 is a plan view of the motor with the rotor removed; and

Figure 5 is an enlarged fragmentary view of an upper portion of the motor illustrating the relationship of the teeth on the rotor with respect to the stator structure when the field winding of the motor is deenergized.

Referring now to the various figures of the drawing, the motor shown therein includes an outer stator ring or sleeve 10 and an inner stator ring or sleeve 11 formed of any suitable ferromagnetic material such as iron or steel, and which are connected together by a base ring 12. While members 10, 11 and 12 are illustrated as being threaded together these members may be secured together in any other suitable manner such as by means of a press fit, or, if desired, they may be formed in one piece.

The outer stator ring 10 has an upper flange portion 13 which projects generally radially inwardly and which is provided with a series of teeth or pole portions 14.

The inner stator ring or sleeve 11 is also provided with a series of teeth or pole portions 15 which are equal in number to the pole portions 14 on the outer stator 10 but which are offset with respect thereto, as is clearly shown in Figure 4 of the drawing.

The lower end of the inner stator ring or sleeve 11 is provided with a base plate 16 which is preferably formed of the same type of ferromagnetic material employed for the stator rings 10 and 11. This base plate 16 may be secured to the inner stator ring 11 in any suitable manner, such as by threading, as indicated at 17, or may be formed integral therewith if desired. A strong permanent magnet 18 is mounted on the base 16 with its magnetic axis parallel to the axis of rotation of the rotor 24, and is secured thereto by a bushing 19 having a head portion 20 bearing against the upper end of the permanent magnet 18 and extending down through a suitable aperture 21 therein. The lower end of the bushing 19 is secured to the base plate 16 in any suitable manner, such as by threading, as at 22.

The bushing 19 is arranged to receive and journal the rotor shaft 23 upon which a rotor 24 of ferromagnetic material is rigidly secured. The rotor 24 is provided with an annular series of teeth or pole portions 25 which correspond in number to the poles 14 on the outer stator ring 10 as well as to the pole portions 15 on the inner stator ring 11. The head portion 20 provides a thrust bearing for the rotor 24.

Under certain circumstances it has been found desirable to provide a metal disk 26 mounted on the rotor shaft 23 and seated against the rotor 24. The metal disk 26 is made of ferromagnetic material and is free to rotate on the shaft 23 with respect to the rotor 24. Such motion is normally resisted, however, by a relatively weak spring washer 27 which is held in place by a collar 28 which is press-fitted on the shaft 23. This provides a greater amount of ferromagnetic material for the flux threading the rotor without creating a large mass whose inertia must be overcome in starting the motor. This greatly reduces the required starting torque as compared with that of a solid rotor of equivalent mass.

A field winding 29 is disposed in the annular space between the outer and inner stator rings 10 and 11, as is clearly shown in Figure 3 of the drawing. A fiber sleeve 30 is also disposed in this annular chamber between the outer and inner stator rings 10 and 11, the fiber sleeve 30 being seated on the inner stator ring 11 while the field winding 29 is slipped over the fiber ring 30. This winding 29 is in the form of a solenoid, the solenoid being wound in such a manner that the poles are at the upper and lower ends of the stator structure formed by the outer and inner stator rings 10 and 11. The stator or field winding 29 is energized through a pair of conductors 31 and 32 which are arranged to be connected to any suitable source of alternating current, such, for example, as a 60-cycle, 110-volt source.

The stator ring 10 is preferably provided with a plurality of ventilation openings 33 as shown in Figures 2 and 3.

For a reason which will presently be made apparent, each of the rotor teeth 25 has its trailing corner cut back as at 34. The leading edge of each rotor tooth is also preferably cut in such a manner as to lean slightly forward in the direction of rotation, as at 35.

The stator teeth 14 on the outer stator ring 10 are preferably slightly tapered at their ends as at 36.

As shown in Figure 4 of the drawing, the teeth 15 of the inner stator ring 11 are disposed substantially opposite the spaces between the adjacent outer stator ring teeth 14. It has been found that the best results may be obtained when the teeth 15 are moved back slightly from a position directly opposite the spaces between the adjacent outer stator ring teeth 14.

Referring now to Figure 3 of the drawing it will be understood that when the field coil 29 is deenergized the magnetic circuit of the structure is as follows: The flux lines produced by the permanent magnet 18 will flow from the upper end of the permanent magnet 18 through the rotor 24 (and to some extent through the disk 26) down through the inner stator ring 11 as well as down through the outer stator ring 10, through the base portions 12 and 16 and then back into the lower end of the permanent magnet 18. Since the rotor will tend to move to a position where the greatest flux concentration lies, it will be apparent that the rotor teeth 25 will tend to assume a position partway between the teeth 14 of the outer stator ring 10 and the teeth 15 of the inner stator ring 11. This position of rest of the rotor 24 is illustrated in Figures 1 and 5 of the drawing. The exact position of rest of the rotor 24 may be varied by varying the proximity of the teeth 15 of the inner stator ring 11 with respect to the rotor 24, as compared with the proximity of the teeth 14 of the outer stator ring 10. It is for the purpose of illustrating the flexibility of this positioning of the rotor 24 in its normal position of rest that the various parts of the motor structure have been shown as being threaded together, but it will, of course, be understood that after this positioning of the parts has been located for maximum efficiency that all or substantially all of the threaded connections may be eliminated.

When the field winding 29 is energized with single phase alternating current, it will be seen that the upper end of the winding 29 first represents a north pole and then a south pole. For the purposes of illustrating and discussing the magnetic circuit, let us assume that the upper end of the permanent magnet 18 is a north pole and its lower end a south pole. When the upper end of the field winding 29 is a north pole the flux line will extend out the end of the field winding into the flange 13 and thence diverge, and part of the flux lines will go down through the outer stator ring 10 which provides a return path therefor and part of the flux lines will return via an air path into the base ring 12 and back into the lower end of the solenoid 29. The inner stator ring 11 acts as a core member for the solenoid and the flux lines flow in part therethrough into the teeth 25 and then out into the outer stator ring 10.

At such an instance of time when the upper end of the solenoid is the north pole the flux lines produced in the inner stator ring 11 by the permanent magnet 18 are in opposition to the flux lines produced therein by core 29. The flux lines established in the outer stator ring by both the permanent magnet 18 and the solenoid 29 are in the same direction. As a consequence thereof the teeth 25 of the rotor are attracted to the teeth 14 since this will produce a lower reluctance path for the flux established by the resultant magnetic field.

This may be stated in a somewhat different fashion by saying that the stator elements 10 and 11 and the base plate 12 in effect provide a yoke for the coil 29, and which yoke has relatively closely spaced polar portions provided by the teeth 14 and 15. Thus when the upper end of the coil 29 is a north pole, the teeth 14 are south poles and the teeth 15 are north poles, and they hence attract and repel respectively the north polarized teeth 25 of the rotor 24.

Upon a reversal of the current in the field winding 29, the polarity of the teeth 14 and 15 is reversed and hence the polarized rotor teeth 25 are attracted to the stator element teeth 15 and repelled by the stator element teeth 14.

We thus see that continued reversal of the direction of current flowing in the field winding 29 will cause rotation of the rotor 24.

The motor which has been illustrated in the various figures of the drawing is caused to rotate in the same direction at all times by cutting off the trailing corners of the rotor teeth 25 and by properly positioning the teeth 15 of the inner stator ring 11 with respect to the teeth 14 of the outer stator ring 10.

Referring particularly to Figures 3 and 5, it will be seen that if the direction of current in the field winding at the instant when the energization circuit is closed is such as to produce a south pole in the teeth 14, the rotor teeth 25 are attracted to the stator teeth 14 which lie nearest to the portion of each rotor tooth which is not cut back at the corner. This would cause rotation of the rotor in the direction indicated by the arrow in Figure 5. It has been found that if the teeth 14 are north poles when the energization circuit of the field winding 29 is first closed, the rotor teeth will move slightly back in a direction opposite to the normal direction of rotation for the first half cycle but will immediately thereafter reverse their direction and start rotating in a clockwise direction, as viewed in Figures 1, 4 and 5.

It is believed that this action is due primarily to the fact that the corner of each rotor tooth 25, which is the trailing corner thereof when the rotor is rotating in its desired direction, is cut back. When the circuit is closed at a time which first produces a north magnetic pole in each stator tooth 14, the rotor 24 will first move backward a half tooth to a point where the rotor teeth 25 overlie the inner stator ring teeth 15, due to the attraction of the latter. As the field current reverses direction the stator teeth 14 on each side of a rotor tooth 15 will try to attract the latter. Because of the cutaway corner on the rotor tooth the stator tooth lying adjacent the cutaway corner will not exert nearly so great a force of attraction as the stator tooth lying adjacent the rotor tooth corner which has not been cut away. This reverses the direction of initial movement of the rotor and starts it in the desired forward direction. The rotor gets enough kick in this direction that it continues to rotate in a forward direction and is not unstable in its operation. The rotor therefore will always rotate in one direction only. The operation may sometimes be improved by positioning the teeth 15 with respect to the teeth 14 so that their radial center lines do not lie directly opposite the radial center line of the spaces between the teeth 14, but rather are displaced slightly in a counter-clockwise direction with respect thereto.

It has been found that a motor constructed in the manner above described provides a relatively large torque for its size and is particularly suitable for driving clock mechanisms and other small rotating mechanisms.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A self-starting synchronous motor comprising a rotor having an annular series of radially outwardly projecting teeth uniformly spaced around the circumference of said rotor, a stator comprising a toothed stator element having its teeth disposed substantially in the plane of rotation of the teeth of said rotor, a second toothed stator element having its teeth disposed below the plane of rotation of said rotor teeth and in close proximity thereto, said second stator element teeth being staggered with respect to said first stator element teeth, one corner of each rotor tooth being cut off, said cut off corner being on the trailing side of each tooth with respect to the desired direction of rotation and said cut back corner being so dimensioned that the remaining end portion of each rotor tooth is appreciably less than the end portion of each confronting stator element tooth, means for establishing an alternating magnetic flux and for passing a portion of said flux through said first and second stator teeth to alternately and oppositely magnetize the two sets of stator teeth, and means for polarizing said rotor teeth.

2. A self-starting synchronous motor comprising a pair of spaced concentric paramagnetic stator shells having a solenoid field winding disposed therebetween with the axis of the solenoid substantially coincidental with the axis of said stator shells, said outer stator shell having an inturned flange extending over one end of said solenoid and having an annular row of teeth projecting generally radially inwardly, said inner stator shell having an annular row of axially extending teeth in proximity to said outer stator teeth and of the same pitch, a rotor having a plurality of radially outwardly extending polarized teeth of the same pitch as said first and second rows of teeth and disposed in proximity to said first and second rows of teeth, said outer stator teeth being staggered with respect to said inner stator teeth, and means for connecting said solenoid field winding to a source of alternating current.

3. A self-starting synchronous motor comprising a pair of spaced concentric paramagnetic stator shells having a solenoid field winding disposed therebetween with the axis of the solenoid substantially coincidental with the axis of said stator shells, said outer and inner stator shells being connected at one end by an annular member of paramagnetic material, said outer stator shell having an inturned flange extending over one end of said solenoid and having an annular row of teeth projecting generally radially inwardly, a rotor mounted for rotation about an axis substantially coincidental with the axes of said stator shells on said solenoid field winding, said rotor being formed of paramagnetic material and having an annular row of teeth projecting generally radially outwardly, said rotor teeth being of the same pitch as said stator teeth, and lying substantially in the same plane as the end of said outer stator shell teeth, said inner stator shell teeth being positioned and dimensioned to lie immediately below said rotor teeth, said outer stator shell teeth being staggered with respect to said inner stator shell teeth, means for connecting said solenoid field winding to a source of alternating current, a stationary permanent magnet having a polar element uniformly spaced from the plane of rotation of said rotor for polarizing said rotor teeth.

4. In a synchronous motor, a ferromagnetic rotor disk having generally radially extending teeth on the outer peripheral portion thereof, a rotor shaft on which said rotor is rigidly mounted, a permanent magnet surrounding said shaft and having one of its magnetic poles disposed in close proximity to said rotor, a pair of concentrically disposed cylindrically shaped ferromagnetic field members, an alternating current solenoid field winding disposed between said field members, the longitudinal axes of said field members and said solenoid being substantially coincidental with the axis of rotation of said rotor, each of said field members having an annular row of teeth in proximity to said rotor teeth and offset with respect to each other, the teeth of the two field members being positioned in the flux path of said solenoid in such a manner that the teeth of one field member are always of opposite polarity with respect to the teeth of the other field member.

5. In a synchronous motor, a ferromagnetic rotor disk having generally radially extending teeth on the outer peripheral portion thereof, a rotor shaft on which said rotor is rigidly mounted, a permanent magnet disposed in close proximity to said rotor and having one of its magnetic poles disposed adjacent said rotor, a pair of concentrically disposed cylindrically shaped ferromagnetic field members, an alternating current solenoid field winding disposed between said field members, the longitudinal axes of said field members and said solenoid being substantially coincidental with the axis of rotation of said rotor, each of said field members having an annular row of teeth in proximity to said rotor teeth and staggered with respect to each other, the teeth of said field members being disposed across the end of said solenoid and terminating opposite the ends of said rotor teeth, the teeth of the other of said field members being disposed below the plane of rotation of said rotor and radially inwardly of the teeth of the other field member.

CYRUS SWIFT.